United States Patent [19]

Heddle et al.

[11] Patent Number: 5,703,794

[45] Date of Patent: Dec. 30, 1997

[54] METHOD AND SYSTEM FOR MIXING AUDIO STREAMS IN A COMPUTING SYSTEM

[75] Inventors: Robert M. Heddle, Kirkland; Frank Dominic Yerrace, Bellevue; Geoff Dahl, Kirkland, all of Wash.

[73] Assignee: Microsoft Corporation, Redmond, Wash.

[21] Appl. No.: 492,709

[22] Filed: Jun. 20, 1995

[51] Int. Cl.$^6$ ................................................ G06K 15/00
[52] U.S. Cl. ...................... 364/514 R; 370/267; 370/522
[58] Field of Search .......................... 364/514 R, 514 C, 364/514 A; 370/62, 110.1, 260, 263, 266, 267, 522; 379/202

[56] References Cited

U.S. PATENT DOCUMENTS

| | | | |
|---|---|---|---|
| 4,730,306 | 3/1988 | Uchida | 379/202 |
| 5,014,267 | 5/1991 | Tompkins et al. | 370/62 |
| 5,127,001 | 6/1992 | Steagall et al. | 379/202 |
| 5,539,741 | 7/1996 | Barraclough et al. | 370/62 |
| 5,570,296 | 10/1996 | Heyl et al. | 364/514 R |
| 5,572,442 | 11/1996 | Schulhof et al. | 364/514 C |

*Primary Examiner*—Douglas W. Olms
*Assistant Examiner*—Shick Hom
*Attorney, Agent, or Firm*—Jones & Askew, LLP

[57] ABSTRACT

The disclosed invention constitutes a method and system, including an audio mixer, for selecting audio streams from one or more applications running on a computer system. An application can register its audio streams with the audio mixer either as sound focus audio streams or as priority audio streams. With respect to the sound focus audio streams, the audio mixer determines which of the applications has the sound focus and generates an audio output signal from those sound focus audio streams to drive the computer's sound device and thereby to produce an audible sound for the user. Sound focus is determined when an application gains the input focus, opens an audio stream, closes an audio stream, or registers with the audio mixer. With respect to the priority audio streams, those priority audio streams are always selected by the audio mixer and are mixed with the sound focus audio streams from the application having sound focus to generate a composite audio output signal. The audio streams are scaled so that mixing audio streams does not normally exceed the volume limit of the sound device.

24 Claims, 8 Drawing Sheets

Case 1

Case 1

Case 2

Case 3

Case 4

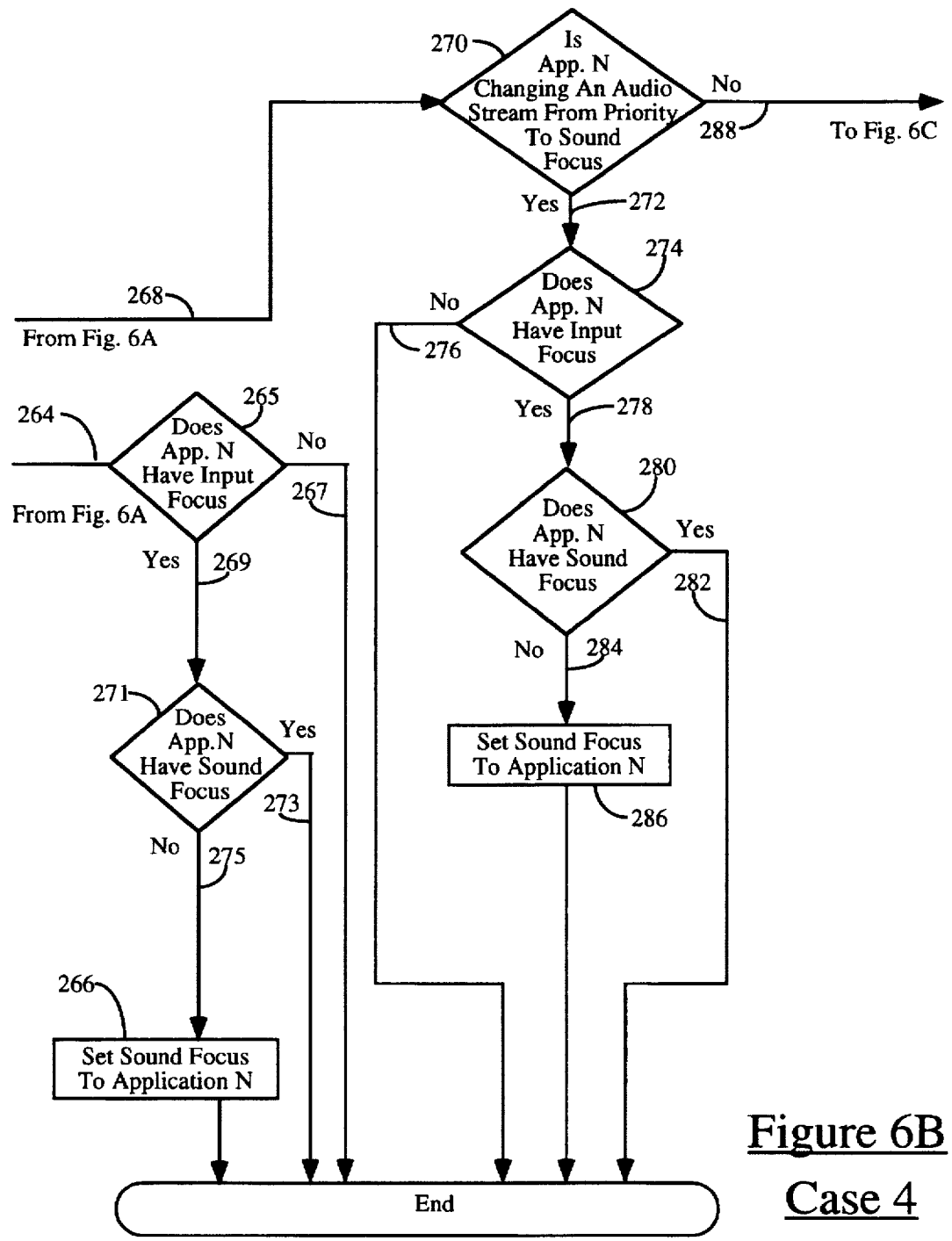

Case 4

5,703,794

METHOD AND SYSTEM FOR MIXING AUDIO STREAMS IN A COMPUTING SYSTEM

BACKGROUND OF THE INVENTION

The present invention relates generally to the manipulation of audio streams in a computing system and more particularly to an improved method and system for selecting one or more audio streams from one or more audio sources and mixing the selected audio streams to produce an audio output signal.

A general purpose computer, particularly a personal computer, has the capability of conveying information to a user both visually and audibly. Such audible information is produced by a number of different audio sources operating on the computer and may include, for example, voice annotations used with word processing programs, sound effects used with computer games, alert sounds produced by the computer's operating system, and background sounds such as music from compact discs (CDs). The audio sources, including different applications or program modules, independently produce audio streams, which if not properly selected and mixed by the computer's operating system, will present a cacophony of sounds to the user. In addition, because the audio streams originate from different audio sources, the resulting audio output signal may vary over a wide range of volume levels.

Conventional operating systems for personal computers do not select and mix audio streams to produce a coherent audio output signal. In existing personal computers, the sound card drivers typically accept only one audio stream at a time. This configuration has two implications for applications running on such a personal computer. First, an application can not count on the sound card being available to it. If the sound card is already in use, the application must alter its behavior so that it does not generate any audio output streams. If the sound card subsequently becomes available, the application's audio stream will still be inaudible because typically the application has already inhibited generation of its audio output streams. Second, if an application generates more than one audio stream simultaneously, the application must mix the audio streams together and then send the resulting audio output stream to the sound card. Mixing audio streams at the application level is difficult and may lead to breaks in the audio stream due to timing considerations at the application level.

Mixing of audio streams at the system level eliminates the problems associated with controlling audio streams at the application level. Mixing the audio streams at the operating system level is accomplished by delivering all audio streams to a single audio mixer which adds the audio streams together and sends the sum, which is the audio output signal, to the sound card. This approach is analogous to what one might consider the traditional design of an audio mixer. There are, however, two problems with this solution of mixing audio streams at the operating system level. First, the resulting audio output signal lacks coherency. If several unrelated audio streams are mixed together, the result will generally be cacophonous. Second, this solution suffers from a lack of "digital head room". For example, when two, sixteen-bit digital audio streams are added together, the resulting sum may require seventeen bits. If the sum is clipped to sixteen bits, audible distortion will result. If the output is dynamically scaled to sixteen bits, the volumes of the component streams will vary when audio streams to the mixer are open or closed. If the audio output signal from the mixer is scaled to a fixed quantity, the audio output signal will be unnecessarily quiet when only one audio input stream is available to the audio mixer.

SUMMARY OF THE INVENTION

The present invention provides a solution to the above identified problems associated with manipulating one or more audio streams originating from one or more audio sources, including applications or other program modules. In accordance with the present invention, a method and system select and mix one or more audio streams from one or more audio sources, such as applications or other program modules. The invention is implemented by means of an audio mixer which selects and mixes one or more audio streams from one or more applications or program modules. The audio streams are selected based on (1) "sound focus" and on (2) priority.

Sound focus is analogous to the concept of "input focus" that is used in the "WINDOWS" operating system which is manufactured and sold by Microsoft Corporation, Redmond, Wash., assignee of the present invention. In the "WINDOWS" operating system, input focus identifies the window of the graphic display that is designated to receive keyboard input and which almost always corresponds to the window "on top" of the graphic display. The window with input focus is the window that the user is currently using, controlling, or watching. If the user positions the cursor on a window and clicks the mouse button, that window has the input focus.

In connection with the present invention, sound focus identifies the application or program module from which the audio streams are selected and passed to the sound card or sound device so that the sound from that application or program module is heard by the user. At most, one application or program module possesses sound focus at any given time. Audio streams from other applications or program modules that do not have the sound focus and do not have priority (as will be later explained) are not audible. If the sound focus changes, the audio mixer mutes the audio streams from the application which had the sound focus and begins sending the audio streams from the new application that has gained the sound focus to the sound card. For a particular application, sound focus for that application is dependent on input focus and on the nature of the application's registration with the audio mixer.

In addition to the application that has sound focus, audio streams from certain audio sources, including applications or program modules, have priority. Audio streams from those priority applications or program modules are selected by the audio mixer, mixed with the audio streams from the application or program module with sound focus, and sent to the sound card or sound device to produce a sound for the user. Applications or program modules that may have priority include alert sounds generated by the operating system or background sounds such as music CDs. Audio streams from applications that have priority are referred to in the art as cross-app. audio streams. For a particular audio stream, priority for that audio stream is dependent on the nature of the application's registration with the audio mixer. The default registration for each audio stream with the audio mixer will be a sound focus registration, but applications can register an audio stream as either a sound focus audio stream or a priority audio stream. Moreover, sound focus is registered on a per audio stream basis, not on a per application basis. Therefore, a single application or program module could simultaneously have sound focus audio streams and priority audio streams. In such a case, the priority audio streams would always be audible, but the sound focus audio streams would only be mixed in when the application has the sound focus.

The selection of audio streams by the audio mixer from one or more applications is determined at the occurrence of four events:

1. When an application gains the input focus (Case 1);
2. When an application opens an audio input stream (Case 2);
3. When an application closes an audio input stream (Case 3); and
4. When an application registers with the audio mixer for sound focus or priority for its audio streams (Case 4).

For Case 1 above, the audio mixer sets the sound focus in accordance with the following logical sequence when an application gains the input focus:

a. Does the application that gained the input focus have an open sound focus audio stream? If yes, that application gets the sound focus.

b. Has the application that gained the input focus registered with the audio mixer that it gets the sound focus whenever it has the input focus even if it does not have open sound focus audio streams? If yes, that application gets the sound focus.

c. Has the application losing the input focus specified in its registration with the audio mixer that it never gets the sound focus if it does not have the input focus? If no, then the audio mixer leaves the sound focus with the application currently having the sound focus.

d. Alternatively, the audio mixer determines from an ordered list of applications which application gets the sound focus. That determination begins by setting a variable X equal to the identity of the application with the current sound focus.

e. If the application X is the last application on the ordered list of applications, the sound focus is set to null, and no application has the sound focus.

f. Alternatively, if the application X is not the last application on the ordered list of applications, the application X is replaced by the application prior to application X on the ordered list of applications.

g. Has the application X specified in its registration with the audio mixer that it never gets the sound focus if it does not have the input focus? If no, the audio mixer sets the sound focus to application X. If yes, the method of the audio mixer returns to step e above.

For Case 2 above, the audio mixer sets the sound focus in accordance with the following logical sequence when an application opens a sound focus audio stream:

a. Does the application that opened the audio stream have the input focus? If no, the audio mixer does nothing, and the sound focus remains with the application that currently has the sound focus.

b. Does the application that opened the audio stream already have the sound focus? If yes, the sound focus remains with the application that currently has the sound focus.

c. Alternatively, the audio mixer sets the sound focus to the application that opened the audio stream.

For Case 3 above, the audio mixer sets the sound focus in accordance with the following logical sequence when an application closes a sound focus audio stream:

a. Does the application closing the audio stream have the current sound focus? If no, the audio mixer does nothing, and the sound focus remains with the application currently having the sound focus.

b. Alternatively, does the application that closed the audio stream have additional open sound focus audio streams? If yes, the sound focus remains with the application that currently has the sound focus.

c. Alternatively, the method goes to step (d) of Case 1 and examines the ordered list of applications to determine which, if any, of the applications on that ordered list should have the sound focus.

For Case 4 above, the audio mixer sets the sound focus in accordance with the following logical sequence when an application registers with the audio mixer:

a. Does the registration for the registering application specify that it gets the sound focus only when it also has the input focus? If yes and if the application currently has the sound focus and if the application does not currently have the input focus, then the audio mixer goes to step (d) of Case 1 and examines the applications on the ordered list of applications that had the input focus.

b. Does the registration for the registering application specify that it gets the sound focus whenever it has the input focus? If yes and if the application currently has the input focus and if the application currently does not have the sound focus, then the audio mixer will set the sound focus to the registering application.

c. Is the registering application changing an audio stream's registration from priority to sound focus? If yes, the audio mixer goes to step (a) of Case 2.

d. Is the registering application changing an audio stream's registration from sound focus to priority? If yes, the audio mixer goes to step (a) of Case 3.

e. Alternatively, the audio mixer does nothing to change the sound focus.

It is therefore an object of the present invention to provide an audio mixer for a general purpose computer which manipulates the audio streams from one or more audio sources, including various applications and program modules, to produce a coherent audio output signal for transmission to the sound card or sound device for the computer system.

It is likewise an object of the present invention to have each application or program module, which produces audio streams, register its audio streams with the audio mixer either as sound focus audio streams or a priority audio streams so that the audio mixer can select and mix the audio streams from those applications or program modules to produce an audio output signal for transmission to the sound card or sound device for the computer system.

It is further an object of the present invention to determine which application or program module has the sound focus at any given time so that the audio streams from that application or program module can be selected, mixed with each other and, if necessary, mixed with any priority audio streams to produce an audio output signal for transmission to the sound card or sound device for the computer system.

Other objects and advantages of the invention will become apparent upon reading the following detailed description and upon reference to the drawings.

BRIEF DESCRIPTION OF THE DRAWINGS

FIG. 6A–6C is a logical flow diagram for determining which application has the sound focus in accordance with the preferred embodiment of the present invention when an application registers with the audio mixer (Case 4).

DETAILED DESCRIPTION OF THE INVENTION

Figure 1:
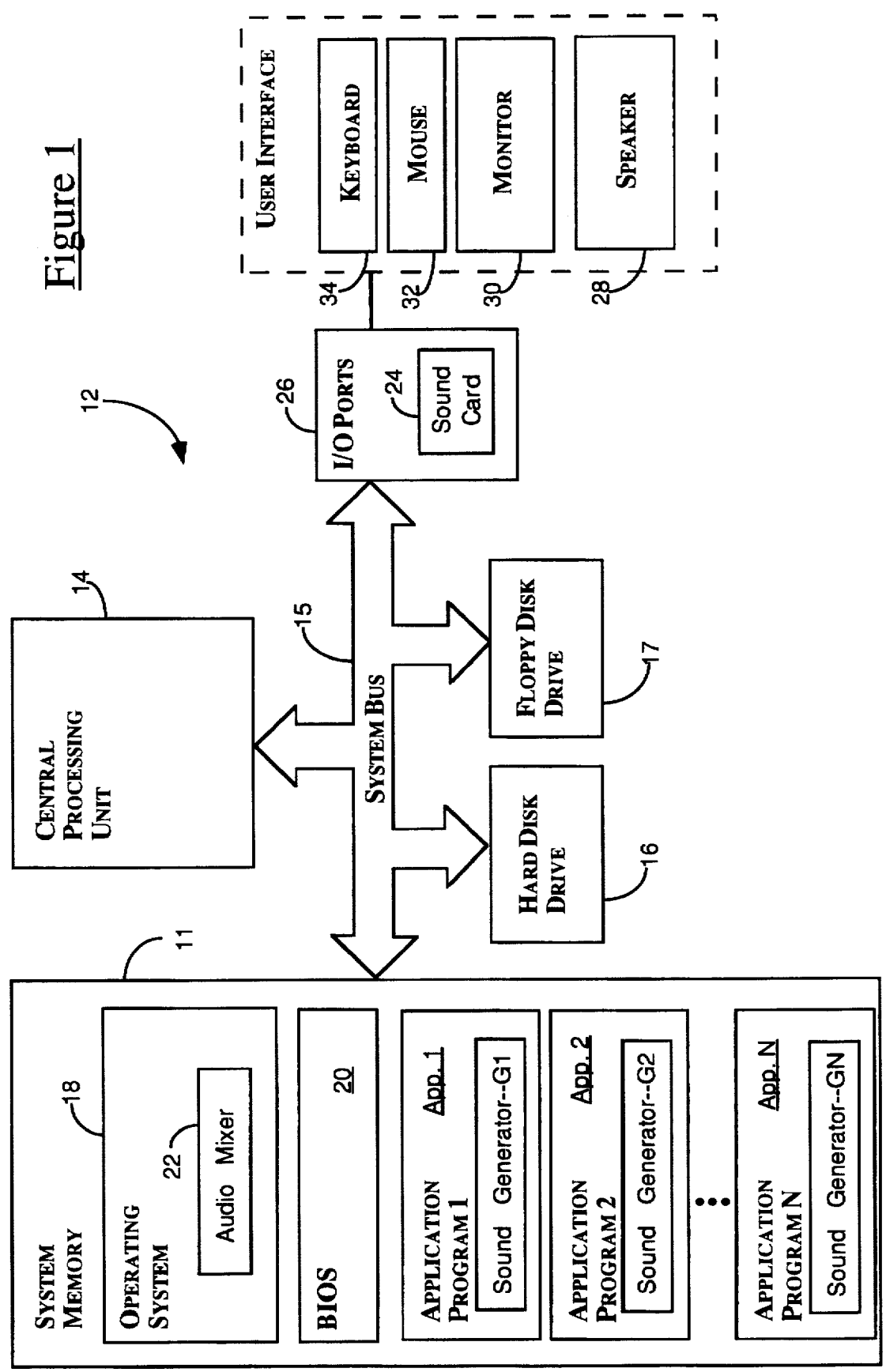
FIG. 1 is a block diagram of the components of a computer system used in connection with the preferred embodiment of the present invention for selecting and mixing one or more audio streams from one or more sound sources including applications or program modules.

Turning first to the nomenclature of the specification, the detailed description which follows is represented largely in terms of processes and symbolic representations of operations by conventional computer components, including a central processing unit (CPU) associated with a general purpose computer system, memory storage devices for the CPU, connected pixel-oriented display devices, and sound reproduction devices. These operations include the manipulation of data bits by the CPU and the maintenance of these bits within data structures supplied by one or more of the memory storage devices. Such data structures impose a physical organization upon the collection of data bits stored within computer memory and represent specific electrical or magnetic elements. These symbolic representations are the means used by those skilled in the art of computer programming and computer construction to convey most effectively teachings and discoveries to others skilled in the art.

For the purposes of this discussion, a process is generally conceived to be a sequence of computer-executed steps leading to a desired result. These steps generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to these signals as bits, values, elements, symbols, characters, terms, numbers, records, files or the like. It should be kept in mind, however, that these and similar terms should be associated with appropriate physical quantities for computer operations, and that these terms are merely conventional labels applied to physical quantities that exist within and during operation of the computer.

It should also be understood that manipulations within the computer are often referred to in terms such as adding, comparing, moving, etc. which are often associated with manual operations performed by a human operator. It must be understood that no involvement of a human operator is necessary or even desirable in the present invention. The operations described herein are machine operations performed in conjunction with a human operator or user that interacts with the computer. The machines used for performing the operation of the present invention, as will be understood, include general purpose digital computers or other similar computing devices.

In addition, it should be understood that the programs, processes, methods, etc. described herein are not related or limited to any particular computer or apparatus. Rather, various types of general purpose machines may be used with programs constructed in accordance with the teachings described herein. Similarly, it may prove advantageous to construct specialized apparatus to perform the method steps described herein by way of dedicated computer systems with hard-wired logic or programs stored in nonvolatile memory, such as read only memory.

Referring now to the drawings, in which like numerals refer to like parts throughout the several views, FIG. 1 shows the components of the preferred operating environment, a computer system 12. The computer system 12 comprises a central processing unit (CPU) 14 that operates the computer system 12 in conjunction with a graphic-based operating system 18 to retrieve, process, store, and communicate data visually and audibly to the user.

The CPU 14 is typically implemented as a microprocessor, such as the models 80386 or 80486 manufactured by Intel Corporation, Santa Clara, Calif. The CPU 14 communicates, by means of control, address, and data signals, with the operating system 18 and with the remaining components of the computer system 12 through a system bus 15.

The operating system 18 comprises a set of computer programs that control the internal functions of the computer system 12 thereby allowing the computer 12 to run application software and other program modules. The operating system 18 is installed in a mass storage device, such as a hard disk drive 16, a floppy disk drive 17, or a ROM chip (not shown). During boot up (initialization) of the computer system 12, the operating system 18 is loaded into the system memory 11. During boot up, a basic input/output system (BIOS) 20 is also loaded into the system memory 11. The BIOS program 20 supplies the device-level control or support services for o the primary input/output devices of the computer, such as speaker 28, monitor 30, mouse 32, and keyboard 34. After boot up, the BIOS program 20 accepts requests from application programs and from the operating system 18 running on the computer system 12 and performs input/output services as requested by those programs. These functions and operations of a conventional BIOS are well known and will not be further described herein.

During operation, computer-implemented application programs, App. 1, App. 2 . . . App. N, are also loaded into system memory 11 from the hard disk drive 16 or the floppy disk drive 17. The application programs operate in conjunction with the operating system 18 to perform specialized functions. Common application programs include word processors, spread sheets, databases, games, etc. In performing their specialized functions, the application programs send information to the operating system from which the operating system can create windows for visual display or create sounds for audible reproduction.

In connection with the present invention, applications, App. 1, App. 2 . . . App. N, running in system memory 11 have sound generators, G1, G2 . . . GN. Each sound generator may produce one or more digital audio streams which digitally represent sounds relating to the function of the particular application that produced the audio streams.

The audio streams from each of the sound generators are connected to audio mixer 22 which may be a separate program module or may be part of the operating system 18.

In accordance with the present invention, the audio mixer 22 selects the sound streams from one or more of the sound generators G1–GN and mixes those sound streams as necessary to produce an output signal. The output signal from the audio mixer 22 is connected via the system bus 15 to sound card or sound device 24 which is associated with the I/O ports 26. The sound device 24 converts the digital output signal from the audio mixer 22 to an analog signal and connects the resulting analog signal to speaker 28 which in turn produces an audible sound for the user.

Figure 2:
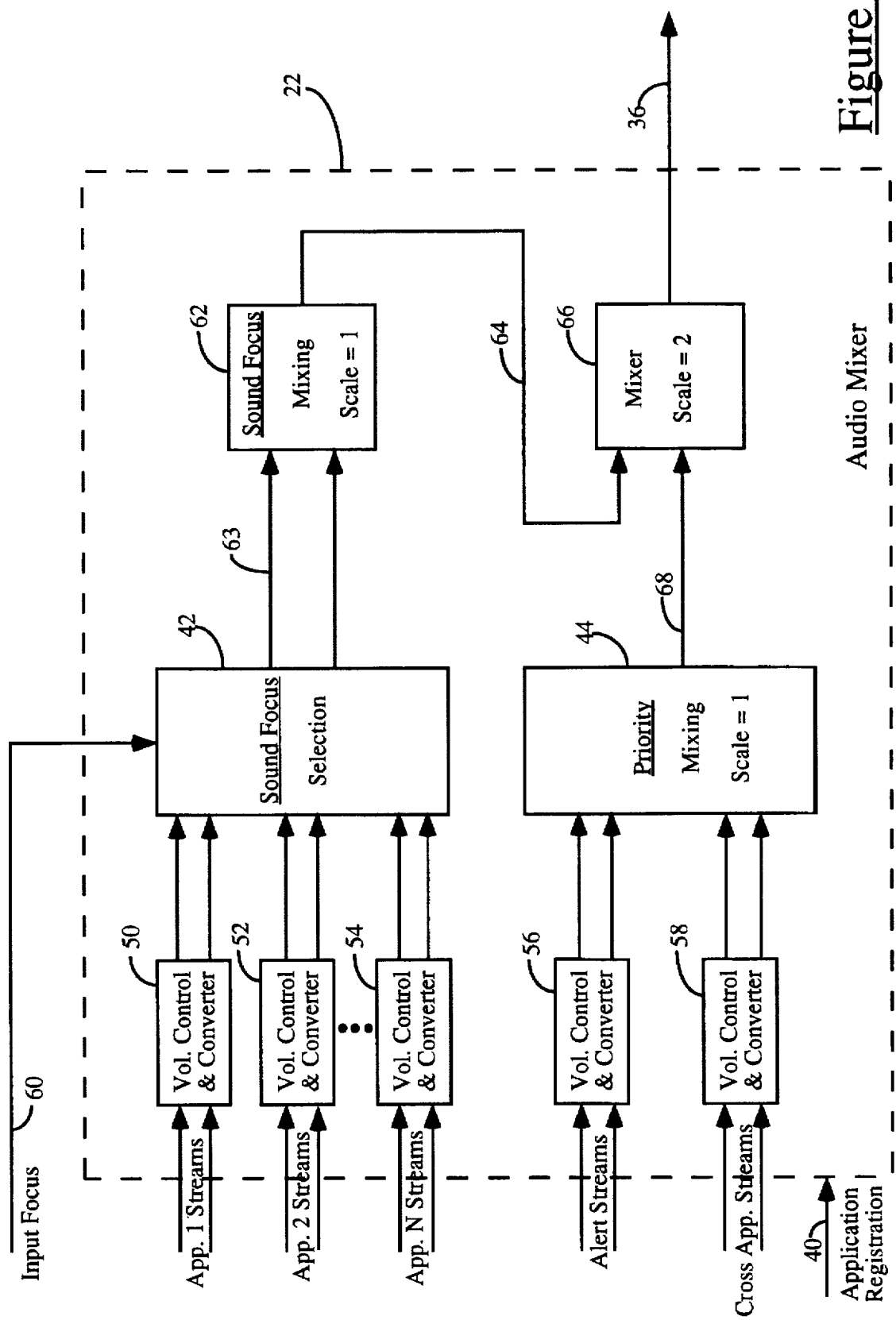
FIG. 2 is a block diagram of the audio mixer used in connection with the preferred embodiment of the present invention for selecting and mixing one or more audio streams from one or more sound sources including applications or program modules.

FIG. 2 schematically illustrates the audio mixer 22 used in connection with the present invention. The audio mixer 22 receives audio streams such as App. 1, App. 2 . . . App. N, alert, and cross-app. The audio mixer 22 selects one or more of those streams, mixes the streams as necessary, and produces an audio output signal on output line 36.

The block diagram of FIG. 2 illustrates a logical configuration of the audio mixer 22 based on the nature of the registration with the audio mixer by each of the applications that produced the audio streams App. 1, App. 2 . . . App. N, alert, and cross-app. For example, the applications that produce audio streams App. 1, App. 2 . . . App. N have registered their audio streams with the audio mixer as normal or sound focus audio streams. By contrast, the program modules that produce the alert audio streams and the applications that produce the cross app. audio streams have registered their audio streams with the audio mixer 22 as priority audio streams. An application may simultaneously use both sound focus streams and priority streams if desired. In accordance with the present invention, the audio mixer 22 will select all of the sound focus audio streams from the application with the sound focus for transmission to the sound device 24. On the other hand, the audio mixer 22 will transmit all of the priority audio streams such as the cross-app. audio streams and alert audio streams to the sound device 24 after being appropriately mixed with the selected sound focus audio streams.

When an application opens an audio stream, the application can register that audio stream with the audio mixer 22 as a sound focus audio stream or a priority audio stream. Such registration can be accomplished, for example, by means of a digital registration signal on registration line 40. If the application registers an audio stream as a normal or sound focus audio stream, the audio stream is logically connected to the sound focus selection component 42 of the audio mixer 22 as shown in FIG. 2. If, on the other hand, the application or program module registers an audio stream as priority audio stream (alert stream or cross app. stream), the audio stream is logically connected to priority mixer 44 of the audio mixer 22. The sound focus selection component 42 determines which one of the sound focus audio streams, App. 1, App. 2 . . . App. N has sound focus. The audio stream with sound focus is connected to sound focus mixer 62 via line 63. The sound focus audio stream is connect from the sound focus mixer 62 to the output mixer 66 via line 64. Alternatively, the priority audio streams such as alert streams and cross-app. streams are mixed together at priority mixer 44 and ultimately mixed with the sound focus audio stream in output mixer 66 to produce a composite output signal on line 36. The nature of the registration of an application, communicated to the audio mixer on line 40, determines whether the audio stream from an application is connected to the sound focus selection component 42 or to the priority mixer 44 as shown in FIG. 2. FIG. 2 thus illustrates one possible logical configuration for the audio mixer 22.

While the block diagram of FIG. 2 illustrates three separate mixers 44, 62, and 66, the audio mixer 22 may be implemented by a single mixer that selects the audio streams and mixes them all at once in accordance with the logical steps illustrated by FIGS. 3, 4, 5 and 6. The single mixer receives all of the priority audio streams and all of the sound focus audio streams from the application with the sound priority and mixes those audio streams all at once. The three mixers 44, 62, and 66 are shown in FIG. 2 for ease of explanation and illustration.

Each of the audio streams is connected to a volume control and a converter module, such as modules 50, 52 . . . 54, 56, 58. Each of the volume control and converter modules 50, 52 . . . 54, 56, 58 provides volume control for each audio stream and converts the format of each audio stream (eight-bit or sixteen-bit samples at an arbitrary sampling frequency) to the format used internally by the audio mixer (sixteen-bit samples at a user configurable sampling frequency). Application audio streams, App. 1, App. 2 . . . App. N, are respectively connected to volume control and converter modules 50, 52 . . . 54. Likewise, the alert streams are connected to volume control and converter 56, and the cross app. streams are connected to volume control and converter 58.

Once the audio streams, App. 1, App. 2 . . . App. N, for the sound focus applications have been processed by the volume control and converter modules, those audio streams are connected to the sound focus selection component 42. The sound focus selection component 42 also receives a control signal on line 60 which is the input focus for the applications running on the computer system 12. In the "WINDOWS" operating system, for example, input focus identifies the window of the graphic display that is designated to receive keyboard input and which almost always corresponds to the window "on top" of the graphic display. The window with input focus is the window that the user is currently using, controlling, or watching. If the user positions the cursor on a window and clicks the mouse button, that window has the input focus. The "focus" represents the part of the interface that will receive the next piece of input if no navigation occurs before the input is generated. For mouse input, the focus always coincides with the pointer (button down) location. For keyboard input, the focus depends on the context:

1. In text, the focus is shown by an insertion point, which indicates where newly typed characters will be inserted.

2. In spreadsheets, the focus is shown by a highlighted cell border, which marks the cell that will receive typed input and that will be affected by commands.

3. In menus and dialog box controls, the focus is shown by an active control indicator, which identifies the control that will be affected by the Select key or by typing.

From the input focus and the nature of the registration of the applications that produce audio streams, App. 1, App. 2 . . . App. N, the sound focus selection component 42 selects the audio streams from one of the applications by assigning that application the sound focus. The sound focus audio streams from the application assigned the sound focus are selected and connected through the sound focus selection component 42 to sound focus mixer 62. At the sound focus mixer 62, the selected audio streams from the selected sound focus application are mixed together and scaled as necessary. Preferably, the multiple audio streams from the selected sound focus application are mixed and scaled with a scale factor equal to 1. After the audio streams from the selected sound focus application are mixed and scaled in the sound focus mixer 62, the resulting composite audio signal on line 64 is connected to output mixer 66.

In addition to the selection of the sound focus audio streams from one of the sound focus applications by the sound focus selection component 42, the priority audio streams, alert and cross app., are connected to the priority mixer 44 through volume control and converters 56 and 58 respectively. The audio mixer 22 is configured to assure that the alert audio streams and cross app. audio streams are always connected through the audio mixer 22 to its output 36 and then to the sound device 24. The priority mixer 44 performs only mixing and scaling. Because the priority signals are considered too important to be muted, the priority mixer does not perform any selection function.

The priority audio input streams are mixed at a scale factor of 1 in priority mixer 44, and the resulting mixed signal is connected to output mixer 66 via line 68. The output mixer 66 receives the selected sound focus audio signal on line 64 and the priority audio signal on line 68 and mixes those signals at a scaling factor of 2. The output mixer 66 uses a scaling factor of 2 to assure that under normal usage conditions the resulting output signal on line 36 does not exceed the sixteen-bit ceiling for volume required by the sound card 24.

As a result, it can be seen that the audio mixer 22 selects sound focus audio streams from one application having sound focus, mixes its audio streams with priority audio streams from multiple applications to produce a coherent output signal on line 36. The output signal on line 36 is then transmitted to the sound device 24 which is capable of handling only one audio signal at a time. As a result, the user hears only the sounds from the application or program module having the sound focus, the necessary alert sounds that have priority, and sounds from cross app. that have a designated priority such as background music from a music CD.

The logical configuration of the audio mixer and the determination of sound focus and priority is determined at four times:

1. When the input focus on line 60 of the audio mixer 22 changes (Case 1);
2. When an application opens a sound focus audio stream (Case 2);
3. When an application closes a sound focus audio stream (Case 3); and
4. When an application registers on line 40 with the audio mixer 22 (Case 4).

Figure 3:
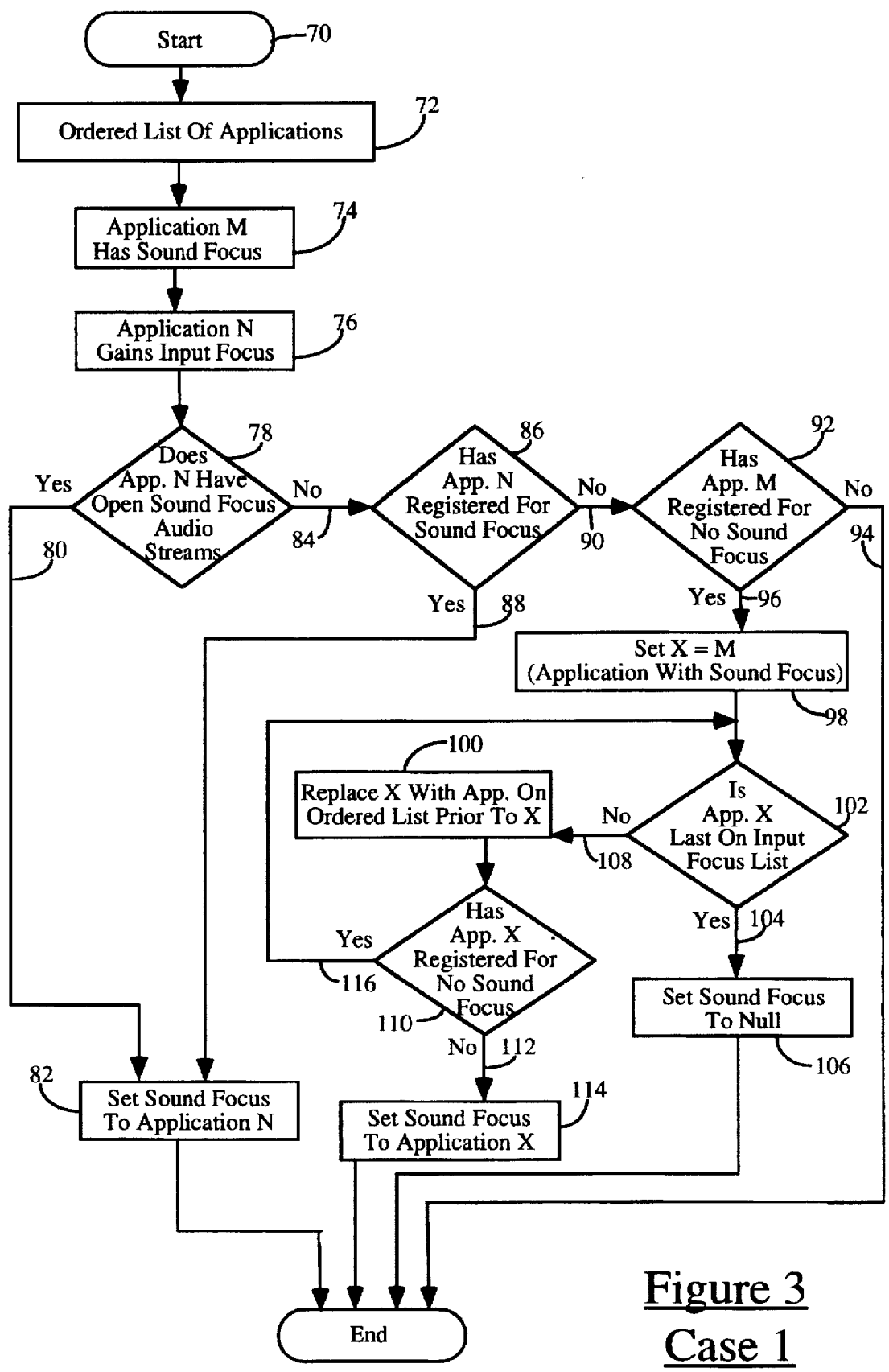
FIG. 3 is a logical flow diagram for determining which application has the sound focus in accordance with the preferred embodiment of the present invention when an application gains the input focus (Case 1).

Case 1 above, which relates to a change in input focus on line 60, is illustrated in FIG. 3. The determination of sound focus begins at step 70 and proceeds to step 72. At step 72, a ordered list of applications is loaded for future reference. The ordered list of applications is the list of applications for the open windows in "z-order". The "z-order" is the list of windows which will next receive the input focus. For example, the window with the input focus is the first on the "z-order" list. If the application for that window is closed, the next window on the "z-order" list will obtain the input focus. At step 74, the application (e.g. application M) which currently has the sound focus is determined. At step 76, application N gains input focus, and that information is communicated to the audio mixer 22 via input focus line 60.

From step 76, the method of the audio mixer proceeds to decision step 78 where the audio mixer 22 determines whether or not the application N, which has gained the input focus, has open sound focus audio streams. If application N has open sound focus audio streams, the method follows the yes branch 80 to step 82 where the sound focus selection component 42 sets the sound focus to application N. Consequently, application N, which gained the input focus, now has the sound focus, and the sound focus audio streams from application N will be connected through the sound focus selection component 42 to the sound focus mixer 62 and output mixer 66 to become part of the output signal on line 36. With the determination of the sound focus at step 82, the method ends.

If, on the other hand, at decisional step 78 the audio mixer determines that application N, which has just gained the input focus, does not have open sound focus audio streams, the method follows the no branch 84 to decisional step 86. At step 86, the audio mixer determines the nature of the registration of application N on line 40 for sound focus. If application N has registered for sound focus whenever it has input focus regardless of whether it has open sound focus audio streams, the method follows the yes branch 88 to step 82. At step 82, the sound focus selection component 42 sets the sound focus to application N.

Alternatively, at decisional step 86, if the audio mixer determines that the application N has not registered for sound focus whenever it gets the input focus, the method follows the no branch 90 to decisional step 92. At step 92, the audio mixer determines the nature of the registration of application M with the audio mixer. If the registration of application M does not specify that it never gets the sound focus if it doesn't have input focus, then the method follows the no branch 94, the sound focus remains the same, and the method ends.

Alternatively, at decisional step 92, if the registration of application M specifies that it never gets the sound focus if it doesn't have input focus, then the method follows the yes branch 96 and begins a process for determining which application other than application M should have the sound focus. At step 98, the audio mixer sets a variable X equal to M, the identity of the application which currently has the sound focus. The method then proceeds to decisional step 102 where the audio mixer determines if application X (the application with the input focus prior to application M, the application with the current sound focus) is last on the ordered list of applications loaded at step 72. If application X is last on the ordered list of applications, the method follows the yes branch 104, and the sound focus is set to null at step 106. Setting the sound focus to null means that no application has the sound focus, and the audio streams such as App. 1, App. 2, ... App. N in FIG. 2 are not selected by the sound focus selection component 42 and are not connected to the output 36.

Alternatively, at step 102, if the application X is not the last application on the ordered list of applications from step 72, the method follows the no branch 108 from step 102 to step 100 where X is replaced with the application from the ordered list that is prior to X. With X thus updated by means of the ordered list of applications, the method proceeds to decision step 110. At decisional step 110, if the registration of application X does not specify that it never gets the sound focus if it doesn't have input focus, the method follows the no branch 112 to step 114. At step 114, the sound focus is set to application X. Alternatively, at step 110, if the registration of application X specifies that it never gets the sound focus if it doesn't have input focus, the method follows yes branch 116 and returns to step 102 for further evaluation of applications on the ordered list of applications.

Figure 4:
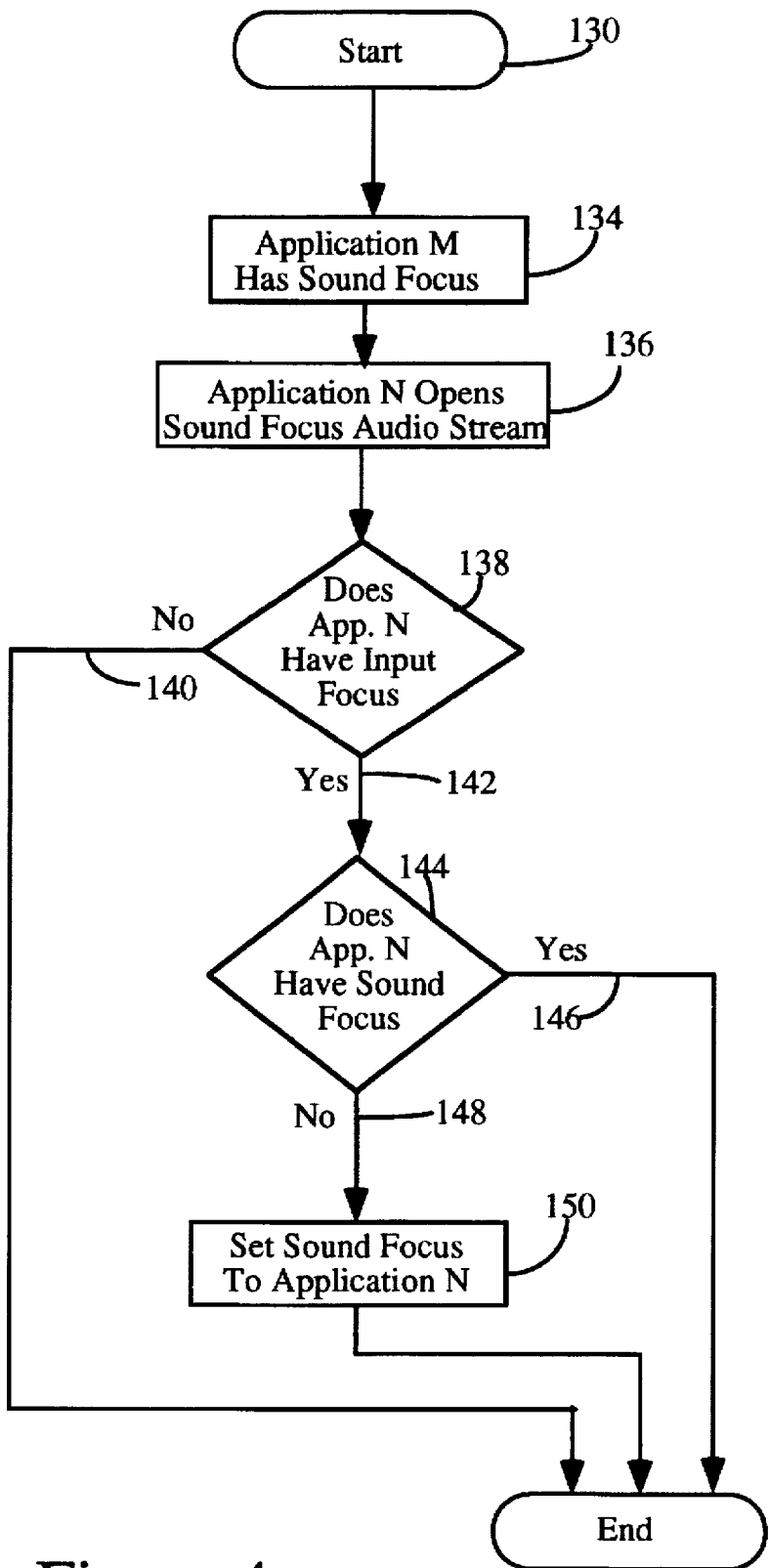
FIGS. 4 is a logical flow diagram for determining which application has the sound focus in accordance with the preferred embodiment of the present invention when an application opens a sound focus audio stream (Case 2).

Case 2 above, which relates to an application opening a sound focus audio stream, is illustrated in FIG. 4. The determination of sound focus begins at step 130 and proceeds to step 134. At step 134, the audio mixer 22 identifies the application, application (e.g. application M) that currently has the sound focus. At step 136, application N opens a sound focus audio stream.

At decisional step 138, the audio mixer determines if application N, the application that opened the sound focus audio stream, has the input focus. If the application N does not have the input focus, the method follows the no branch 140, and the method ends with the sound focus remaining with application M, the application that currently has the sound focus.

Alternatively, if at decisional step 138, the audio mixer determines that application N has the input focus, the method follows the yes branch 142 to decisional step 144. At decisional step 144, the audio mixer determines whether the application N already has the sound focus (i.e. application N is the same as application M). If the application N already has the sound focus, opening a sound focus audio stream by application N does not change the sound focus, and the method follows yes branch 146, and the method ends.

Alternatively, if at decisional step 144 the audio mixer determines that the application N does not have the sound focus, the method follows no branch 148 to step 150. At step 150, the audio mixer sets the sound focus to application N. Consequently, N secures the sound focus when it opens a sound focus audio stream if application N has the input focus (decisional step 138, yes branch) and if application N does not already have the sound focus (decisional step 144, no branch).

Figure 5:
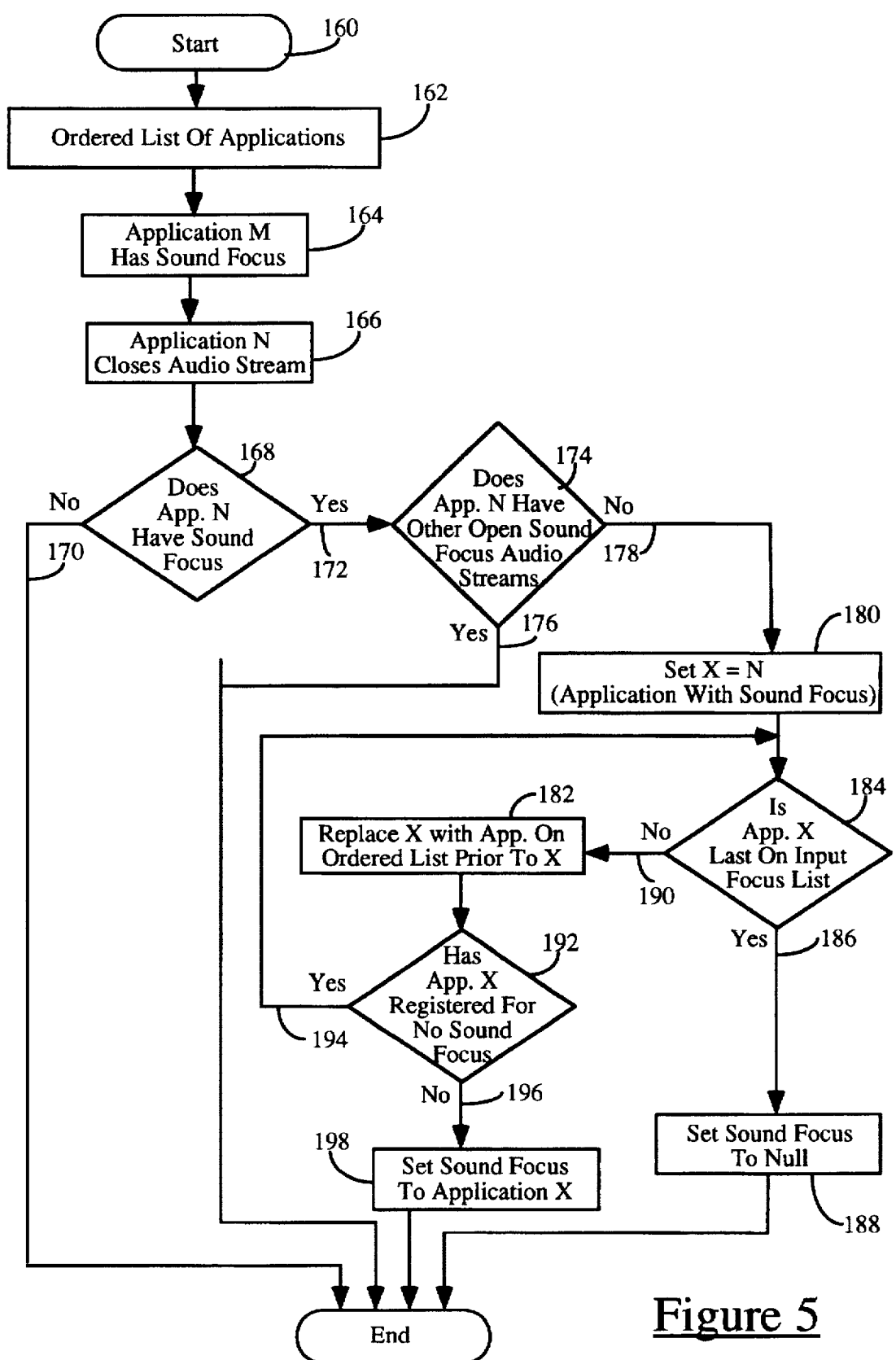
FIG. 5 is a logical flow diagram for determining which application has the sound focus in accordance with the preferred embodiment of the present invention when an application closes a sound focus audio stream (Case 3).

Case 3 above, which relates to an application closing a sound focus audio stream, is illustrated in FIG. 5. Determination of sound focus begins at step 160 and proceeds to step 162. At step 162, an ordered list of application is loaded for future reference. At step 164, the audio mixer determines which application (e.g. application M) has the current sound focus. At step 166, application N closes a sound focus audio stream.

At decisional step 168, the audio mixer determines whether or not application N, which closed a sound focus audio stream, is the application with the current sound focus (application N is the same as application M). If application N is not the application with the current sound focus, the method follows the no branch 170, and the method ends with the sound focus remaining with application M, the application with the current sound focus.

Alternatively, if at decisional step 168, the audio mixer determines that application N, the application closing a sound focus audio stream, is the same as the application currently having the sound focus, the method follows yes branch 172 to decisional step 174. At decisional step 174, the audio mixer determines whether application N, which closed a sound focus audio stream, has other sound focus audio streams open. If the application N does have other audio streams open, the method follows the yes branch 176, and the method ends with the sound focus remaining with application N.

Alternatively, if at decisional step 174, the audio mixer determines that the application N does not have other open sound focus audio streams, the method follows no branch 178 to step 180. Step 180 begins a sequence of steps to determine which application from the ordered list of applications should now have the sound focus. Particularly, at step 180, a variable X is set equal to M (App M and App N are the same), the identity of the application with the current sound focus. At decisional step 184, the audio mixer determines if the application X is the last application on the ordered list of applications (step 162). If the application X is the last application on the ordered list of applications, the method follows yes branch 186 to step 188. At step 188, the sound focus is set to null which means that the method ends with no application having the sound focus.

Alternatively, if at decisional step 184, application X is not the last application on the ordered list of applications, the method follows no branch 190 to step 182. At step 182, the application X is replaced by the application prior to X on the ordered list of applications. At decisional step 192, the audio mixer checks the registration status of application X. If the registration of application X specifies that it never gets the sound focus if it doesn't have input focus, the method follows yes branch 194 which returns to step 184 to assess the next application on the ordered list prior to X.

Alternatively, at decisional step 192, if the registration of application X does not specify that it never gets the sound focus if it doesn't have input focus, then the method follows no branch 196 to step 198. At step 198, the audio mixer sets the sound focus to application X, and the method ends.

Figure 6A:
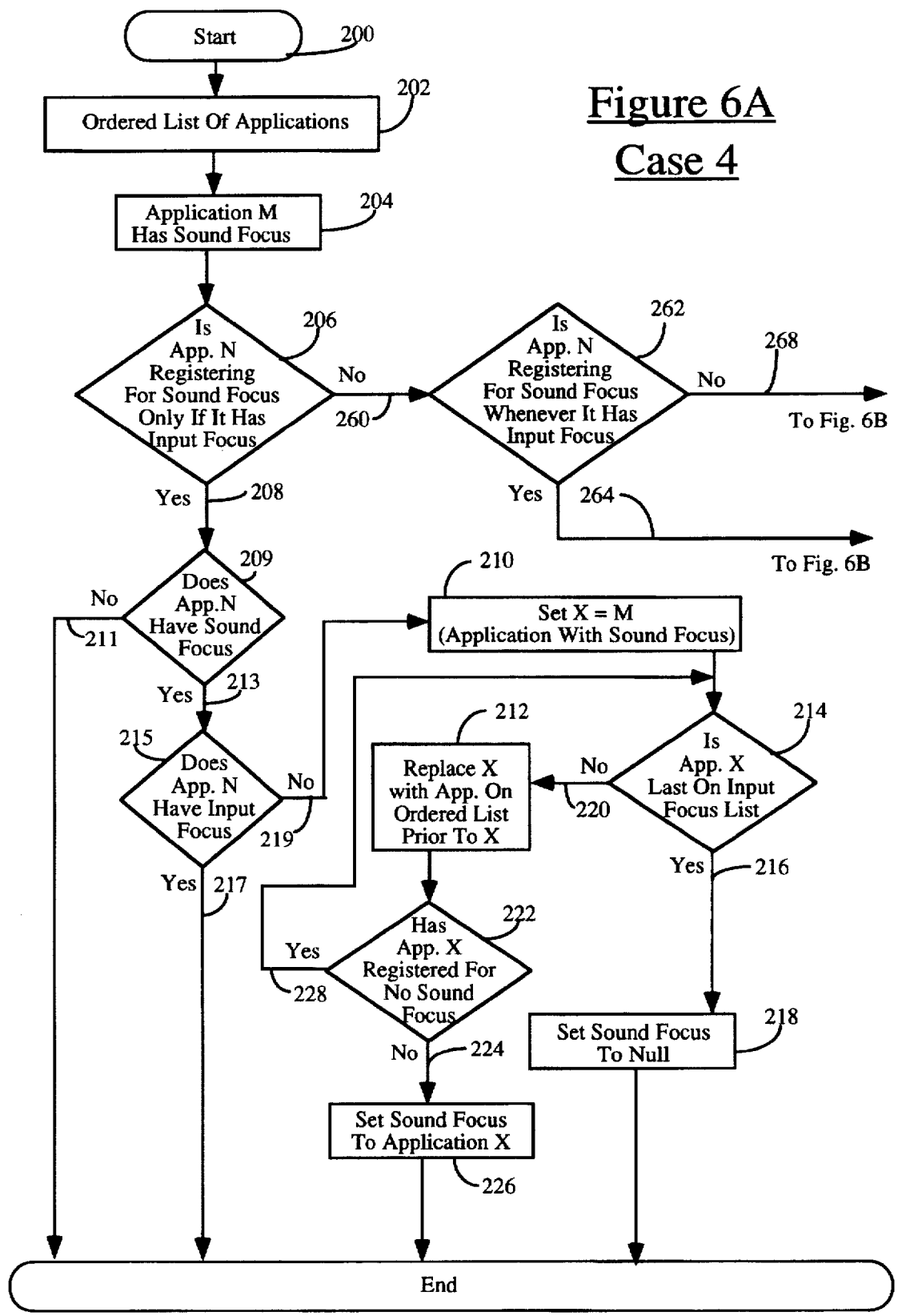
Figure 6C:
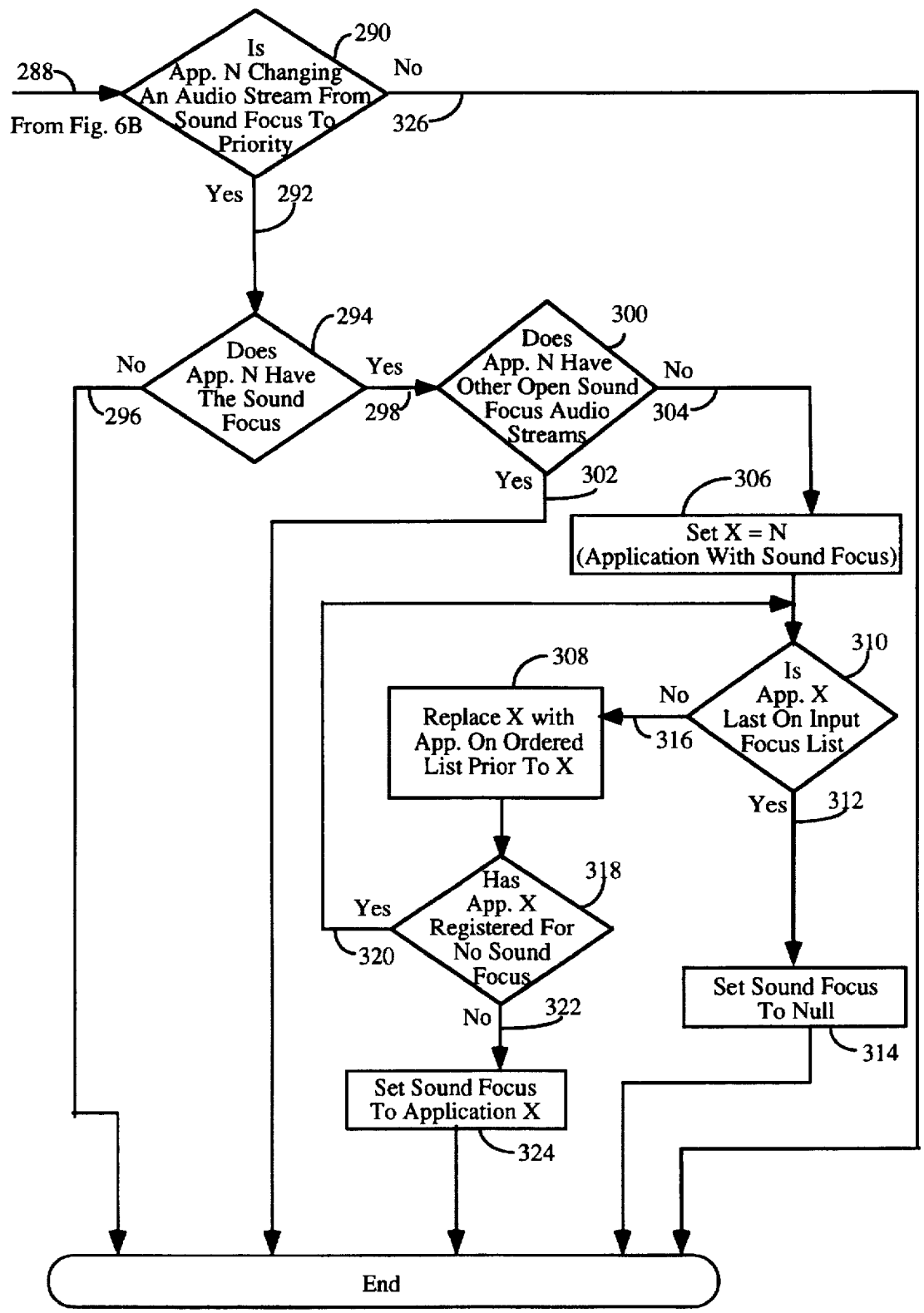

Case 4 above, which relates to the registration of an application on line 40, is illustrated in FIGS. 6A–C. A determination of sound focus and priority begins at step 200 and proceeds to step 202. At 202, an ordered list of applications is loaded for future reference. At step 204, the audio mixer identifies the application (e.g. application M) which currently has the sound focus.

At decisional step 206, the audio mixer determines if application N is registering for sound focus only if it has the input focus. If application N is registering in that fashion, the method follows yes branch 208 to decisional step 209. At step 209, the audio mixer determines whether application N has the sound focus. If application N does not have the sound focus, the method follows the no branch 211, and the method ends with the sound focus remaining with application M, the current holder of the sound focus. Alternatively, if the application N has the sound focus, then the method follows the yes branch 213 to decisional step 215. At step 215, the method determines if the application N has the input focus. If the application N has the input focus, then the method follows the yes branch 217, and the method ends with N having the sound focus. If the application N does not have the input focus at step 215, the method follows the no branch 219 to step 210.

Beginning at step 210, the method seeks to determine which application on the ordered list of applications should get the sound focus. At step 210, the audio mixer sets a variable X equal to M (App M and App N are the same), the identity of the application which currently has the sound focus. The method then proceeds to decisional step 214. At step 214, the audio mixer determines if application X is last on the ordered list of applications loaded at step 202. If application X is last on the ordered list of applications, the method follows the yes branch 216, and the sound focus is set to null at step 218. Setting the sound focus to null means that no application has the sound focus, and the sound focus audio streams such as App. 1, App. 2, . . . App. N in FIG. 2 are not selected by the sound focus selection component 42 and are not connected to the output 36.

Alternatively, at step 214, if the application X is not the last application on the ordered list from step 202, the method follows the no branch 220 from step 214 to step 212. At step 212, X is replaced by the prior application on the ordered list. At decisional step 222, the audio mixer determines the nature of the registration by application X. If the registration of application X does not specify that it never gets the sound focus and if it does not have the input focus, the method follows the no branch 224 to step 226. At step 226, the sound focus is set to application X. Alternatively, at step 222, if the registration of application X specifies that it never gets the sound focus and if it does not have the input focus, the method follows yes branch 228 and returns to step 212 for further evaluation of applications on the ordered list.

Alternatively, if, at decisional step 206, the application N is not registering for sound focus only if it has the input focus, the method follows no branch 260 to decisional step 262. At decisional step 262, the audio mixer determines if application N is registering for sound focus whenever it has the input focus. If application N is registering in that fashion, the method follows the yes branch 264 to decisional step 265 (FIG. 6B). At step 265, the method determines whether the application N has the input focus. If the application N does not have the input focus, the method follows the no branch 267, and the method ends with the sound focus remaining with the application M. Alternatively, if, at step 265, the method determines that application N has the input focus, the method follows the yes branch 269 to decisional step 271.

At step 271, the method determines whether the application N has the sound focus. If the application N has the sound focus, the method follows the yes branch 273, and the method ends with application N having the sound focus. Alternatively, if the application N does not have the sound focus, the method follows the no branch 275 to step 266. At step 266, the audio mixer sets the sound focus to application N.

Alternatively, if at step 262, application N is not registering for sound focus whenever it has the input focus, the method follows no branch 268 to decisional step 270 (FIG. 6B). At decisional step 270, the audio mixer again examines the nature of the registration by application N. If application N is changing the registration of an audio stream from a priority registration to a sound focus registration, the method follows yes branch 272 to decisional step 274. At step 274, the audio mixer determines whether the application N has the input focus. If the application N does not have the input focus, the method follows the no branch 276, and the method ends leaving the sound focus with application M, the current holder of the sound focus. Alternatively, if at decisional step 274, the audio mixer determines that the application N has the input focus, the method follows yes branch 278 to decisional step 280.

At decisional 280, the audio mixer determines whether the application N has the current sound focus. If the application N does have the current sound focus at decisional step 280, the method follows yes branch 282, and the method ends with the sound focus remaining with application M (App M and App N are the same), the current holder of the sound focus.

Alternatively, if at decisional step 280, the audio mixer determines that the application N does not have current the sound focus, the method follows no branch 284 to step 286. At step 286, the audio mixer sets the sound focus to application N, and the method ends.

Alternatively, if at decisional step 270, application N is not changing the registration of an audio stream from priority to sound focus, the method follows no branch 288 to decisional step 290 (FIG. 6C).

At decisional step 290, the audio mixer determines if the application N is changing the registration of one of its audio streams from a sound focus registration to a priority registration. If application N is changing the audio stream's registration from a sound focus registration to a priority registration, the method follows yes branch 292 to decisional step 294.

At decisional step 294, the audio mixer determines whether or not application N is the application with the current sound focus. If application N is not the application with the current sound focus, the method follows no branch 296, and the method ends with the sound focus remaining with application M (App M and App N are the same), the application with the current sound focus.

Alternatively, if at decisional step 294, the audio mixer determines that application N has the sound focus, the method follows yes branch 298 to decisional step 300. At decisional step 300, the audio mixer determines whether application N has other open sound focus audio streams. If the application N does have other open sound focus audio streams, the method follows yes branch 302, and the method ends with the sound focus remaining with application M (App M and App N are the same), the application that currently has the sound focus.

Alternatively, if at decisional step 300, the audio mixer determines that the application N does not have other open sound focus audio streams, the method follows no branch 304 to step 306. At step 306, a variable X is set equal to N. At decisional step 310, the audio mixer determines if the application X is the last application on the ordered list of applications (step 202). If the application X is the last application on the ordered list, the method follows yes branch 312 to step 314. At step 314, the sound focus is set to null which means that the method ends with no application having the sound focus.

Alternatively, if at decisional step 310, application X is not the last application on the input focus list, the method follows no branch 316 to step 308. At step 308, X is replaced by the application prior to X on the ordered list. At decisional step 318, the audio mixer checks the registration status of application X. If the registration of application X specifies that it never gets the sound focus if it doesn't have input focus, the method follows yes branch 320 which returns to step 310 to access the next application on the ordered list prior to X.

Alternatively, at decisional step 318, if the registration of application X does not specify that it never gets the sound focus if it doesn't have input focus, then the method follows no branch 322 to step 324. At step 324, the audio mixer sets the sound focus to application X, and the method ends.

Alternatively, at decisional step 290, if the audio mixer determines that the application N is not changing the registration of its audio stream from a sound focus registration to a priority registration, the method follows no branch 326, and the method ends leaving the sound focus unchanged with application M.

Because the audio mixer of the present invention evaluates the sound focus setting at each of the four specified times, the sound focus is current at all times. The audio mixer of the present invention also assures that alert and cross app. are always sent to the sound card to assure that the audio streams from those important program modules are always heard by the user. The audio mixer of the present invention also assures that the output signal to the sound card is scaled to eliminate distortion. The present invention also assures that applications do not have to provide selection, mixing, or scaling functions for their own audio streams.

What is claimed is:

1. A method for generating an audio output signal from one or more audio streams produced by one or more audio sources operating on a general purpose computer system in which each audio source can selectively have input focus, comprising the steps:

a. for each audio source, registering zero or more audio streams as sound focus audio streams;

b. determining which of the audio sources has sound focus based on the input focus and on the registration the audio streams of the audio sources as sound focus audio streams;

c. selecting the sound focus audio streams from the audio source that has the sound focus;

d. generating the audio output signal by mixing the selected sound focus audio streams of the audio source having the sound focus; and e. converting the audio output signal to an audible sound.

2. The method of claim 1, wherein the method further comprises the step of:

a. controlling the volume of the sound focus audio streams from the audio sources prior to the step of selecting the sound focus audio streams from the audio source that has the sound focus.

3. The method of claim 1 or 2, wherein the method further comprises the steps of:

a. designating zero or more of the audio streams as priority audio streams; and b. mixing the priority audio streams from the audio sources with the selected sound focus audio streams to generate a composite audio output signal; and c. converting the composite audio output signal to an audible sound.

4. The method of claim 3, wherein mixing the priority audio streams with the sound focus audio streams to generate the composite audio output signal further includes scaling the priority audio streams and the sound focus audio streams.

5. The method of claim 1, wherein the audio source with the sound focus is determined, when an audio source gains input focus, in accordance with the following logical sequence:

a. If the audio source that gained the input focus has an open sound focus audio stream, that audio source gets the sound focus;

b. If the audio source that gained the input focus has registered with the audio mixer that it gets the sound focus whenever it has the input focus even if it does not have open sound focus audio streams, that audio source gets the sound focus;

c. If the audio source losing the input focus has not specified in its registration with the audio mixer that it never gets the sound focus if it does not have the input focus, then the audio mixer leaves the sound focus with the audio source currently having the sound focus;

d. Alternatively, if the audio source losing the input focus has specified in its registration with the audio mixer that it never gets the sound focus if it does not have the input focus, the audio mixer determines from an ordered list of audio sources which audio source gets the sound focus by setting a variable X equal to the identity of the audio source with the current sound focus;

e. If no audio source on the ordered list qualifies for sound focus because audio source X is the last audio source on the ordered list of audio sources, the sound focus is set to null, and no audio source has the sound focus;

f. Alternatively, replace audio source X with the audio source prior to X on the ordered list of audio sources;

g. If the audio source X has not specified in its registration with the audio mixer that it never gets the sound focus if it does not have the input focus, the audio mixer sets the sound focus to audio source;

h. Alternatively, if the audio source X has specified in its registration with the audio mixer that it never gets the sound focus if it does not have the input focus, the method of the audio mixer returns to step (e) above.

6. The method of claim 1, wherein the audio source with the sound focus is determined, when an audio source opens a sound focus audio input stream, in accordance with the following logical sequence:

a. If the audio source that opened the audio stream does not have the input focus, the audio mixer does nothing, and the sound focus remains with the audio source that currently has the sound focus;

b. If the audio source that opened the sound focus audio stream already has the sound focus, the audio mixer does nothing, and the sound focus remains with the audio source that currently has the sound focus;

c. Alternatively, the audio mixer sets the sound focus to the audio source that opened the sound focus audio stream.

7. The method of claim 1, wherein the audio source with the sound focus is determined, when an audio source closes a sound focus audio stream, in accordance with the following logical sequence:

a. If the audio source closing the sound focus audio stream does not have the current sound focus, the audio mixer does nothing, and the sound focus remains with the audio source currently having the sound focus;

b. Alternatively, if the audio source that closed the sound focus audio stream has additional open sound focus audio streams, the audio mixer does nothing, and the audio focus remains with the audio source that currently has the sound focus;

c. Alternatively, the audio mixer determines from an ordered list of audio sources which audio source gets the sound focus by setting a variable X equal to the identity of the audio source that closed the sound focus audio stream;

d. If no audio source on the ordered list qualifies for sound focus because audio source X is the last audio source on the ordered list of audio sources, the sound focus is set to null, and no audio source has the sound focus;

e. Alternatively, replace audio source X with the audio source prior to X on the ordered list of audio sources;

f. If the audio source X has not specified in its registration with the audio mixer that it never gets the sound focus if it does not have the input focus, the audio mixer sets the sound focus to audio source X;

g. Alternatively, if the audio source X has specified in its registration with the audio mixer that it never gets the sound focus if it does not have the input focus, the method of the audio mixer returns to step (d) above.

8. The method of claim 1, wherein the audio source with the sound focus is determined, when an audio source registers with the audio mixer, in accordance with the following logical sequence:

a. If the registration for the registering audio source specify that it gets the sound focus only when it also has the input focus and if the audio source currently has the sound focus and if the audio source does not have the input focus, then the audio mixer goes to step (b);

b. The audio mixer determines from an ordered list of audio sources with the input focus which audio source gets the sound focus by setting a variable X equal to the identity of the audio source with the current sound focus;

c. If no audio source on the ordered list qualifies for sound focus because audio source X is the last audio source on the ordered list, the sound focus is set to null, and no audio source has the sound focus;

d. Alternatively, replace audio source X with the audio source prior to X on the ordered list of audio sources;

e. If the audio source gaining the input focus has not specified in its registration with the audio mixer that it never gets the sound focus if it does not have the input focus, the audio mixer sets the sound focus to audio source X;

f. Alternatively, if the audio source gaining the input focus has specified in its registration with the audio mixer that it never gets the sound focus if it does not have the input focus, the method of the audio mixer returns to step (c) above;

g. Alternatively, if the registration for the registering audio source specifies that it gets the sound focus whenever it has the input focus, and the registering audio source currently has the input focus, and the registering audio source currently does not have the sound focus, then the audio mixer will set the sound focus to the registering audio source;

h. If the registering audio source is changing the registration of its audio streams from priority to sound focus, the audio mixer goes to step (i) below;

i. If the registering audio source does not have the input focus, the audio mixer does nothing, and the sound focus remains with the audio source that currently has the sound focus;

j. If the registering audio source already has the sound focus, the audio mixer does nothing, and the sound focus remains with the audio source that currently has the sound focus;

k. Alternatively, the audio mixer sets the sound focus to the registering audio source;

l. If the registering audio source changing the registration of its audio streams from sound focus to priority, the audio mixer goes to step (m) below;

m. If the registering audio source does not have the current sound focus, the audio mixer does nothing, and the sound focus remains with the audio source currently having the sound focus;

n. Alternatively, if the registering audio source has additional open sound focus audio streams, the audio mixer does nothing, and the audio focus remains with the audio source that currently has the sound focus;

o. Alternatively, the method goes to step (p) below and examines the ordered list of audio source recently having the input focus to determine which, if any, of the audio sources on that ordered list should have the sound focus;

p. The determination of step (o) begins by setting a variable X equal to the identity of the registering audio source;

q. If no audio source on the ordered list qualifies for sound focus because audio source X is the last audio source on the ordered list of audio sources, the sound focus is set to null, and no audio source has the sound focus;

r. Alternatively, replace audio source X with the audio source prior to X on the ordered list of audio sources;

s. If the audio source X has not specified in its registration with the audio mixer that it never gets the sound focus if it does not have the input focus, the audio mixer sets the sound focus to audio source X;

t. Alternatively, if the audio source X has specified in its registration with the audio mixer that it never gets the sound focus if it does not have the input focus, the method of the audio mixer returns to step (q) above;

u. Alternatively, the audio mixer does nothing to change the sound focus.

9. An audio mixer for mixing audio streams in a general purpose computing system, in which audio source can selectively have input focus, comprising:

a. an audio output;

b. audio inputs for receiving audio streams from a plurality of audio sources wherein zero or more audio streams are registered as sound focus audio streams;

c. control inputs for receiving control signals including an input focus control signal and an audio source registration signal;

d. a selection component connected to the audio inputs and the control inputs for receiving the sound focus audio streams and control signals for:
 i. determining which audio source possesses sound focus based on the input focus control signal and the audio source registration signal; and
 ii. connecting the sound focus audio streams from audio source possessing sound focus to the audio output to generate an audio output signal on the audio output of the audio mixer.

10. The audio mixer of claim 9, wherein the audio mixer further comprises:

a. a volume control interposed between the audio inputs and the selection component.

11. The audio mixer of claim 9 or 10, wherein the audio mixer further comprises:

a. a priority mixer for selecting audio streams from audio sources that have registered with the audio mixer as priority audio streams; and b. an output mixer for mixing the priority audio streams with the sound focus audio streams to generate a composite audio output signal at the audio output.

12. The audio mixer of claim 11, wherein the output mixer includes a scaler for scaling the priority audio streams and the audio streams from the sound focus audio streams.

13. The audio mixer of claim 9, wherein the selection component determines the audio source with the sound focus as a result of an audio source gaining input focus in accordance with the following logical sequence:

a. If the audio source that gained the input focus has an open sound focus audio stream, that audio source gets the sound focus;

b. If the audio source that gained the input focus has registered with the audio mixer that it gets the sound focus whenever it has the input focus even if it does not have open sound focus audio streams, that audio source gets the sound focus;

c. If the audio source losing the input focus has not specified in its registration with the audio mixer that it never gets the sound focus if it does not have the input focus, then the audio mixer leaves the sound focus with the audio source currently having the sound focus;

d. Alternatively, if the audio source losing the input focus has specified in its registration with the audio mixer that it never gets the sound focus if it does not have the input focus, the audio mixer determines from a ordered list of audio sources which audio source gets the sound focus by setting a variable X equal to the identity of the audio source with the current sound focus;

e. If no audio source on the ordered list qualifies for sound focus because audio source X is the last audio source on the ordered list of audio sources, the sound focus is set to null, and no audio source has the sound focus;

f. Alternatively, replace audio source X with the audio source prior to X on the ordered list of audio sources;

g. If the audio source X has not specified in its registration with the audio mixer that it never gets the sound focus if it does not have the input focus, the audio mixer sets the sound focus to audio source X;

h. Alternatively, if the audio source X has specified in its registration with the audio mixer that it never gets the sound focus if it does not have the input focus, the method of the audio mixer returns to step (e) above.

14. The audio mixer of claim 9, wherein the selection component determines the audio source with the sound focus as a result of an audio source opening a sound focus audio stream in accordance with the following logical sequence:

a. If the audio source that opened the audio stream does not have the input focus, the audio mixer does nothing, and the sound focus remains with the audio source that currently has the sound focus;

b. If the audio source that opened the sound focus audio stream already has the sound focus, the audio mixer does nothing, and the sound focus remains with the audio source that currently has the sound focus;

c. Alternatively, the audio mixer sets the sound focus to the audio source that opened the sound focus audio stream.

15. The audio mixer of claim 9, wherein the selection component determines the audio source with the sound focus as a result of an audio source closing a sound focus audio stream in accordance with the following logical sequence:

a. If the audio source closing the sound focus audio stream does not have the current sound focus, the audio mixer does nothing, and the sound focus remains with the audio source currently having the sound focus;

b. Alternatively, if the audio source that closed the sound focus audio stream has additional open sound focus audio streams, the audio mixer does nothing, and the audio focus remains with the audio source that currently has the sound focus;

c. Alternatively, the audio mixer determines from an ordered list of audio sources which audio source gets the sound focus by setting a variable X equal to the identity of the audio source that closed the sound focus audio stream;

d. If no audio source on the ordered list qualifies for sound focus because audio source X is the last audio source on the ordered list of audio sources, the sound focus is set to null, and no audio source has the sound focus;

e. Alternatively, replace audio source X with the audio source prior to X on the ordered list of audio sources;

f. If the audio source X has not specified in its registration with the audio mixer that it never gets the sound focus if it does not have the input focus, the audio mixer sets the sound focus to audio source X;

g. Alternatively, if the audio source X has specified in its registration with the audio mixer that it never gets the sound focus if it does not have the input focus, the method of the audio mixer returns to step (d) above.

16. The audio mixer of claim 9, wherein the selection component determines the audio source with the sound focus as a result of an audio source registering with the audio mixer in accordance with the following logical sequence:

a. If the registration for the registering audio source specify that it gets the sound focus only when it also has the input focus and if the audio source currently has the sound focus and if the audio source does not have the input focus, then the audio mixer goes to step (b);

b. The audio mixer determines from an ordered list of audio sources with the input focus which audio source gets the sound focus by setting a variable X equal to the identity of the audio source with the current sound focus;

c. If no audio source on the ordered list qualifies for sound focus because audio source X is the last audio source on the ordered list, the sound focus is set to null, and no audio source has the sound focus;

d. Alternatively, replace audio source X with the audio source prior to X on the ordered list of audio sources;

e. If the audio source gaining the input focus has not specified in its registration with the audio mixer that it never gets the sound focus if it does not have the input focus, the audio mixer sets the sound focus to audio source X;

f. Alternatively, if the audio source gaining the input focus has specified in its registration with the audio mixer that it never gets the sound focus if it does not have the input focus, the method of the audio mixer returns to step (c) above;

g. Alternatively, if the registration for the registering audio source specifies that it gets the sound focus whenever it has the input focus, and the registering audio source currently has the input focus, and the registering audio source currently does not have the sound focus, then the audio mixer will set the sound focus to the registering audio source;

h. If the registering audio source is changing the registration of its audio streams from priority to sound focus, the audio mixer goes to step (i) below;

i. if the registering audio source does not have the input focus, the audio mixer does nothing, and the sound focus remains with the audio source that currently has the sound focus;

j. If the registering audio source already has the sound focus, the audio mixer does nothing, and the sound focus remains with the audio source that currently has the sound focus;

k. Alternatively, the audio mixer sets the sound focus to the registering audio source;

l. If the registering audio source changing the registration of its audio streams from sound focus to priority, the audio mixer goes to step (m) below;

m. If the registering audio source does not have the current sound focus, the audio mixer does nothing, and the sound focus remains with the audio source currently having the sound focus;

n. Alternatively, if the registering audio source has additional open sound focus audio streams, the audio mixer does nothing, and the audio focus remains with the audio source that currently has the sound focus;

o. Alternatively, the method goes to step (p) below and examines the ordered list of audio source recently having the input focus to determine which, if any, of the audio sources on that ordered list should have the sound focus;

p. The determination of step (o) begins by setting a variable X equal to the identity of the registering audio source;

q. If no audio source on the ordered list qualifies for sound focus because audio source X is the last audio source on the ordered list of audio sources, the sound focus is set to null, and no audio source has the sound focus;

r. Alternatively, replace audio source X with the audio source prior to X on the ordered list of audio sources;

s. If the audio source X has not specified in its registration with the audio mixer that it never gets the sound focus if it does not have the input focus, the audio mixer sets the sound focus to audio source X;

t. Alternatively, if the audio source X has specified in its registration with the audio mixer that it never gets the sound focus if it does not have the input focus, the method of the audio mixer returns to step (q) above;

u. Alternatively, the audio mixer does nothing to change the sound focus.

17. A computer-readable medium having computer-executable instructions for generating an audio output signal from one or more audio streams produced by one or more audio sources operating on a general purpose computer system in which each audio source can selectively have input focus, comprising the steps:

a. for each audio source, registering zero or more audio streams as sound focus audio streams;

b. determining which of the audio sources has sound focus based on the input focus and on the registration the audio streams of the audio sources as sound focus audio streams;

c. selecting the sound focus audio streams from the audio source that has the sound focus;

d. generating the audio output signal by mixing the selected sound focus audio streams of the audio source having the sound focus; and e. converting the audio output signal to an audible sound.

18. The computer-readable medium of claim 17, having the further computer-executable instructions for performing the step of:

a. controlling the volume of the sound focus audio streams from the audio sources prior to the step of selecting the sound focus audio streams from the audio source that has the sound focus.

19. The computer-readable medium of claim 17 or 18, having the further computer-executable instructions for performing the steps of:

a. designating zero or more of the audio streams as priority audio streams; and b. mixing the priority audio streams from the audio sources with the selected sound focus audio streams to generate a composite audio output signal; and c. converting the composite audio output signal to an audible sound.

20. The computer-readable medium of claim 17, having the further computer-executable instructions for mixing the priority audio streams with the sound focus audio streams to generate the composite audio output signal and scaling the priority audio streams and the sound focus audio streams.

21. The computer-readable medium of claim 17, having the further computer-executable instructions for identifying the audio source with the sound focus, when an audio source gains input focus, in accordance with the following logical sequence:

a. If the audio source that gained the input focus has an open sound focus audio stream, that audio source gets the sound focus;

b. If the audio source that gained the input focus has registered with the audio mixer that it gets the sound focus whenever it has the input focus even if it does not have open sound focus audio streams, that audio source gets the sound focus;

c. If the audio source losing the input focus has not specified in its registration with the audio mixer that it never gets the sound focus if it does not have the input focus, then the audio mixer leaves the sound focus with the audio source currently having the sound focus;

d. Alternatively, if the audio source losing the input focus has specified in its registration with the audio mixer that it never gets the sound focus if it does not have the input focus, the audio mixer determines from a ordered list of audio sources which audio source gets the sound focus by setting a variable X equal to the identity of the audio source with the current sound focus;

e. If no audio source on the ordered list qualifies for sound focus because audio source X is the last audio source on the ordered list of audio sources, the sound focus is set to null, and no audio source has the sound focus;

f. Alternatively, replace audio source X with the audio source prior to X on the ordered list of audio sources;

g. If the audio source X has not specified in its registration with the audio mixer that it never gets the sound focus if it does not have the input focus, the audio mixer sets the sound focus to audio source X;

h. Alternatively, if the audio source X has specified in its registration with the audio mixer that it never gets the sound focus if it does not have the input focus, the method of the audio mixer returns to step (e) above.

22. The computer-readable medium of claim 17, having the further computer-executable instructions for identifying the audio source with the sound focus, when an audio source opens a sound focus audio input stream, in accordance with the following logical sequence:

a. If the audio source that opened the audio stream does not have the input focus, the audio mixer does nothing, and the sound focus remains with the audio source that currently has the sound focus;

b. If the audio source that opened the sound focus audio stream already has the sound focus, the audio mixer does nothing, and the sound focus remains with the audio source that currently has the sound focus;

c. Alternatively, the audio mixer sets the sound focus to the audio source that opened the sound focus audio stream.

23. The computer-readable medium of claim 17, having the further computer-executable instructions for identifying the audio source with the sound focus, when an audio source closes a sound focus audio stream, in accordance with the following logical sequence:

a. If the audio source closing the sound focus audio stream does not have the current sound focus, the audio mixer does nothing, and the sound focus remains with the audio source currently having the sound focus;

b. Alternatively, if the audio source that closed the sound focus audio stream has additional open sound focus audio streams, the audio mixer does nothing, and the audio focus remains with the audio source that currently has the sound focus;

c. Alternatively, the audio mixer determines from an ordered list of audio sources which audio source gets the sound focus by setting a variable X equal to the identity of the audio source that closed the sound focus audio stream;

d. If no audio source on the ordered list qualifies for sound focus because audio source X is the last audio source on the ordered list of audio sources, the sound focus is set to null, and no audio source has the sound focus;

e. Alternatively, replace audio source X with the audio source prior to X on the ordered list of audio sources;

f. If the audio source X has not specified in its registration with the audio mixer that it never gets the sound focus if it does not have the input focus, the audio mixer sets the sound focus to audio source X;

g. Alternatively, if the audio source X has specified in its registration with the audio mixer that it never gets the sound focus if it does not have the input focus, the method of the audio mixer returns to step (d) above.

24. The computer-readable medium of claim 17, having the further computer-executable instructions for identifying the audio source with the sound focus, when an audio source registers with the audio mixer, in accordance with the following logical sequence:

a. If the registration for the registering audio source specify that it gets the sound focus only when it also has the input focus and if the audio source currently has the sound focus and if the audio source does not have the input focus, then the audio mixer goes to step (b);

b. The audio mixer determines from an ordered list of audio sources with the input focus which audio source gets the sound focus by setting a variable X equal to the identity of the audio source with the current sound focus;

c. If no audio source on the ordered list qualifies for sound focus because audio source X is the last audio source on the ordered list, the sound focus is set to null, and no audio source has the sound focus;

d. Alternatively, replace audio source X with the audio source prior to X on the ordered list of audio sources;

e. If the audio source gaining the input focus has not specified in its registration with the audio mixer that it never gets the sound focus if it does not have the input focus, the audio mixer sets the sound focus to audio source X;

f. Alternatively, if the audio source gaining the input focus has specified in its registration with the audio mixer that it never gets the sound focus if it does not have the input focus, the method of the audio mixer returns to step (c) above;

g. Alternatively, if the registration for the registering audio source specifies that it gets the sound focus whenever it has the input focus, and the registering audio source currently has the input focus, and the registering audio source currently does not have the sound focus, then the audio mixer will set the sound focus to the registering audio source;

h. If the registering audio source is changing the registration of its audio streams from priority to sound focus, the audio mixer goes to step (i) below;

i. If the registering audio source does not have the input focus, the audio mixer does nothing, and the sound focus remains with the audio source that currently has the sound focus;

j. If the registering audio source already has the sound focus, the audio mixer does nothing, and the sound focus remains with the audio source that currently has the sound focus;

k. Alternatively, the audio mixer sets the sound focus to the registering audio source;

l. If the registering audio source changing the registration of its audio streams from sound focus to priority, the audio mixer goes to step (m) below;

m. If the registering audio source does not have the current sound focus, the audio mixer does nothing, and the sound focus remains with the audio source currently having the sound focus;

n. Alternatively, if the registering audio source has additional open sound focus audio streams, the audio mixer does nothing, and the audio focus remains with the audio source that currently has the sound focus;

o. Alternatively, the method goes to step (p) below and examines the ordered list of audio source recently having the input focus to determine which, if any, of the audio sources on that ordered list should have the sound focus;

p. The determination of step (o) begins by setting a variable X equal to the identity of the registering audio source;

q. If no audio source on the ordered list qualifies for sound focus because audio source X is the last audio source on the ordered list of audio sources, the sound focus is set to null, and no audio source has the sound focus;

r. Alternatively, replace audio source X with the audio source prior to X on the ordered list of audio sources;

s. If the audio source X has not specified in its registration with the audio mixer that it never gets the sound focus if it does not have the input focus, the audio mixer sets the sound focus to audio source X;

t. Alternatively, if the audio source X has specified in its registration with the audio mixer that it never gets the sound focus if it does not have the input focus, the method of the audio mixer returns to step (q) above;

u. Alternatively, the audio mixer does nothing to change the sound focus.

* * * * *